(12) United States Patent
Larson et al.

(10) Patent No.: US 9,845,883 B2
(45) Date of Patent: Dec. 19, 2017

(54) SHAFT SEAL ASSEMBLY

(75) Inventors: Richard M. Larson, Des Plaines, IL (US); David C. Rupp, Grayslake, IL (US); Reynaldo Fernandez, Chicago, IL (US); John Stark, Hanover Park, IL (US); Gerald A. Greca, Carleton, MI (US)

(73) Assignee: Federal-Mogul LLC, Southfield, MI (US)

( * ) Notice: Subject to any disclaimer, the term of this patent is extended or adjusted under 35 U.S.C. 154(b) by 26 days.

(21) Appl. No.: 13/492,143

(22) Filed: Jun. 8, 2012

(65) Prior Publication Data

US 2012/0313328 A1    Dec. 13, 2012

Related U.S. Application Data

(60) Provisional application No. 61/495,075, filed on Jun. 9, 2011.

(51) Int. Cl.
*F16J 15/32* (2016.01)
*F16J 15/3276* (2016.01)
*F16J 15/3252* (2016.01)

(52) U.S. Cl.
CPC ....... *F16J 15/3276* (2013.01); *F16J 15/3252* (2013.01)

(58) Field of Classification Search
CPC .. F16J 15/3232; F16J 15/3244; F16J 15/3276; F16J 15/3252; F16J 15/324
USPC ...... 277/549, 551, 552, 353, 412; 192/69.41
See application file for complete search history.

(56) References Cited

U.S. PATENT DOCUMENTS

| | | | |
|---|---|---|---|
| 3,341,265 A | | 9/1967 | Paterson |
| 4,208,057 A | * | 6/1980 | Messenger .................... 277/309 |
| 4,402,515 A | | 9/1983 | Malott |
| 4,421,326 A | * | 12/1983 | Drygalski ..................... 277/552 |
| 4,448,461 A | | 5/1984 | Otto |

(Continued)

FOREIGN PATENT DOCUMENTS

| CN | 1643276 A | 7/2005 |
|---|---|---|
| CN | 101457840 A | 6/2009 |

(Continued)

OTHER PUBLICATIONS

International Search Report PCT/US2012/041491 dated Sep. 20, 2012.

*Primary Examiner* — Nathan Cumar
(74) *Attorney, Agent, or Firm* — Robert L. Stearns; Dickinson Wright, PLLC

(57) ABSTRACT

A shaft seal assembly for establishing a liquid-tight seal between a steering knuckle and an axle shaft is provided. The shaft seal assembly includes an outer case and a first elastomeric member attached to one another. The elastomeric member has a castellated feature including a plurality of projections extending in a radially outward direction and separated from one another by a plurality of grooves. When the shaft seal assembly is installed in the steering knuckle, a cavity is presented between the steering knuckle and the first elastomeric member. Together, the grooves and cavity allow air to flow from a hub on one side of the seal assembly to a vacuum port in the steering knuckle. The cavity extends circumferentially around the seal assembly, and thus, air flow from the hub to the vacuum port is not dependent upon the orientation of the seal assembly relative to the steering knuckle.

15 Claims, 3 Drawing Sheets

(56) References Cited

U.S. PATENT DOCUMENTS

| | | | |
|---|---|---|---|
| 4,874,261 A * | 10/1989 | Colanzi | F16C 33/7883 |
| | | | 277/574 |
| 4,936,591 A | 6/1990 | Romero | |
| 4,981,303 A | 1/1991 | Matsushima et al. | |
| 5,004,248 A * | 4/1991 | Messenger | F16J 15/3256 |
| | | | 277/351 |
| 5,186,472 A | 2/1993 | Romero | |
| 5,269,536 A | 12/1993 | Matsushima et al. | |
| 5,522,600 A | 6/1996 | Duckwall | |
| RE35,309 E | 8/1996 | Matsushima et al. | |
| 5,642,889 A * | 7/1997 | Pauler | F16J 15/3276 |
| | | | 277/552 |
| 5,649,710 A | 7/1997 | Kanda | |
| 5,813,675 A * | 9/1998 | Otto | F16C 33/7879 |
| | | | 277/407 |
| 6,315,296 B1 * | 11/2001 | Oldenburg | 277/353 |
| 6,464,228 B1 | 10/2002 | Oldenburg | |
| 6,726,212 B2 | 4/2004 | Oldenburg | |
| 7,000,750 B2 * | 2/2006 | Ewer | B60K 17/3515 |
| | | | 192/69.41 |
| 7,055,828 B2 | 6/2006 | Hatch et al. | |
| 7,159,871 B2 | 1/2007 | Oldenburg | |
| 7,594,664 B2 | 9/2009 | Maskaliunas | |
| 7,658,386 B2 | 2/2010 | Oldenburg | |
| 7,959,157 B2 | 6/2011 | Dobbs et al. | |
| 2002/0149154 A1 * | 10/2002 | Oldenburg | 277/549 |
| 2004/0227303 A1 * | 11/2004 | Bock et al. | 277/549 |

FOREIGN PATENT DOCUMENTS

| | | |
|---|---|---|
| DE | 19509771 C1 | 9/1996 |
| FR | 2625282 A1 | 6/1989 |
| JP | S5899560 A | 6/1983 |
| JP | S6060373 A | 4/1985 |
| JP | H0680065 U | 11/1994 |
| JP | 2002181198 A | 6/2002 |

\* cited by examiner

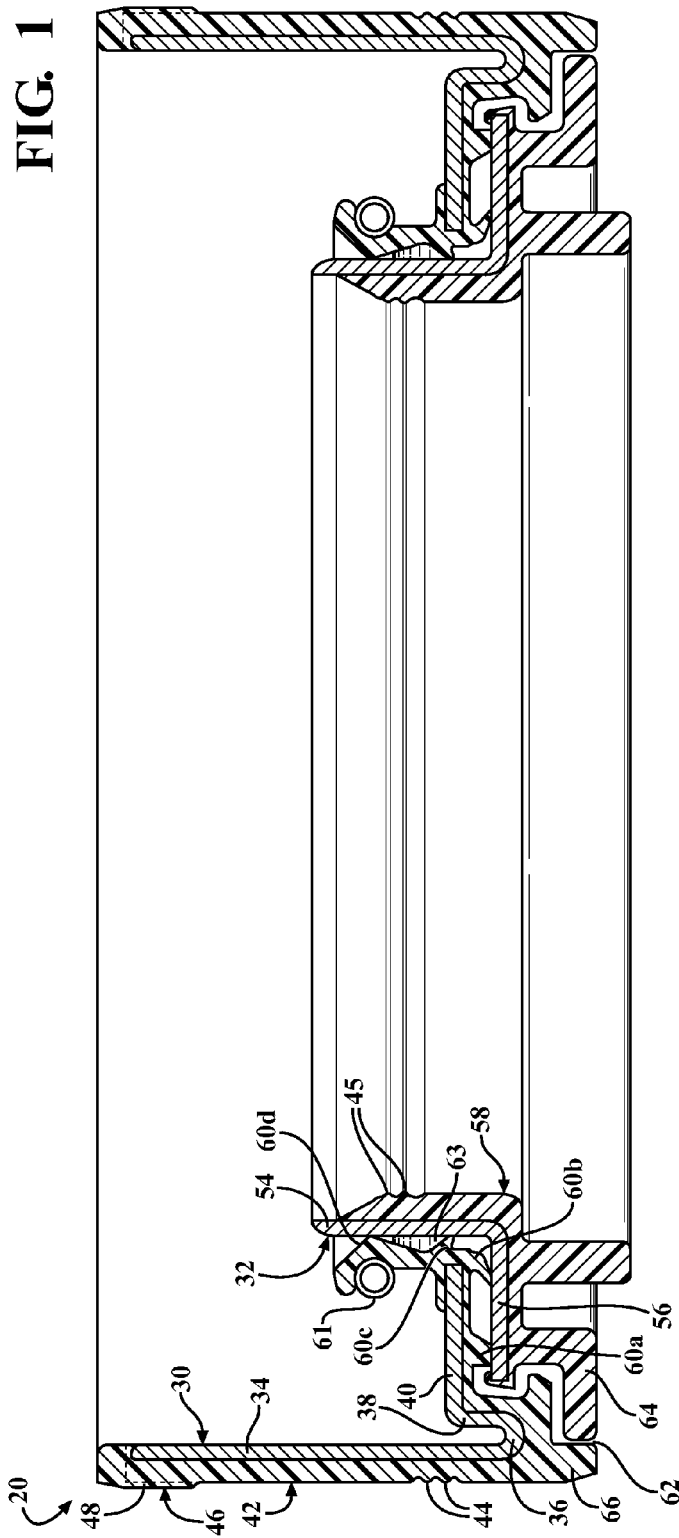
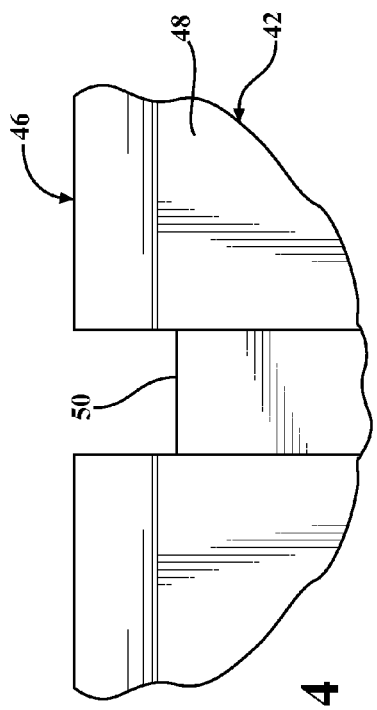

SHAFT SEAL ASSEMBLY

CROSS REFERENCE TO RELATED APPLICATION

This application claims the benefit of U.S. Provisional Application Ser. No. 61/495,075, filed Jun. 9, 2011.

BACKGROUND OF THE INVENTION

1. Field of the Invention

This invention relates generally to shaft seals, and more particularly to shaft seals having a vacuum feature for allowing air to pass through a portion of the seal.

2. Related Art

Radial lip shaft seal assemblies are used in numerous rotating machine applications including wheel hubs, shaft journals and anti-friction bearings. In one particular application, a radial lip shaft seal assembly is installed as a unit within a bore of a steering knuckle to establish a seal between the steering knuckle and a half axle, or an axle shaft, of a front wheel assembly on a 4×4, or four-wheel drive vehicle.

Many 4×4 vehicles include front wheel assemblies with locking hubs and an Electronic-Shift-On-the-Fly (ESOF) system which engages and disengages the locking hubs to and from the vehicle's drivetrain via a vacuum signal. Typically, a high vacuum level causes the hubs to engage with the vehicle's drivetrain, whereas a low vacuum level causes the hubs to disengage from the vehicle's drivetrain. After the vacuum is released, the locking hubs are configured to remain in the proper (engaged or disengaged) mode until another vacuum signal is received. If the ESOF system is not functioning properly, the 4×4 system may not engage and/or disengage as intended. In addition to being an inconvenience to the driver of the vehicle, this could also lead to damage in the locking hubs or in other components of the front wheel assemblies.

The radial seal assembly of such front wheel assemblies of 4×4 vehicles with ESOF systems is typically located near at least one vacuum port in the steering knuckle. The radial seal assembly cooperates with the ESOF system by allowing the vacuum port to selectively extract air from the locking hub. Occasionally, the known radial seal assemblies will partially or completely block the vacuum ports in the steering knuckles, thereby interfering with the vehicle's ESOF system. Such interference could happen if the known seal assembly is installed in the steering knuckle in an incorrect orientation or if the seal assembly unintentionally moves relative to the steering knuckle during operation of the vehicle.

SUMMARY OF THE INVENTION

According to at least one aspect of the present invention, a seal assembly is provided for sealing a steering knuckle to an axle shaft of a vehicle. The seal assembly includes an inner case configured to receive the axle shaft and an outer case and configured to be received within an inner bore of the steering knuckle. At least one elastomeric member is in engagement with one of the inner and outer cases and includes at least one lip in sliding engagement with the other of the inner and outer cases to establish a liquid-tight seal between the axle shaft and the steering knuckle when the axle shaft is rotated. Either the outer case or the elastomeric member includes a castellated feature including a plurality of radially outwardly extending projections spaced circumferentially from one another by grooves, or channels, to present a cavity between the seal assembly and the steering knuckle when the seal assembly is positioned within the inner bore of the steering knuckle. The cavity and grooves allow air to flow from a hub to a vacuum port in the steering knuckle. Because the cavity extends circumferentially around the seal assembly, the passage of air from the hub to the vacuum port is not dependent upon the orientation of the seal assembly relative to the steering knuckle. This provides for manufacturing advantages as compared to other known seal assemblies since an assembly worker does not have to insert the seal assembly into the steering knuckle in a predetermined orientation and also for reliability advantages since the seal assembly will function adequately, even if it rotates relative to the steering knuckle during operation of the vehicle.

According to another aspect of the invention, the seal assembly includes a first elastomeric member in engagement with the outer case and a second elastomeric member in engagement with the inner case. Only the first elastomeric member frictionally engages the steering knuckle, and only the second elastomeric member frictionally engages the axle shaft. Thus, the seal assembly can be quickly installed onto these components without a high force press, which is required for other known seal assemblies.

According to yet another aspect of the invention, the first and second elastomeric members present a complicated labyrinth extending therebetween to restrict the passage of dirt, water or other contaminants across the seal assembly.

BRIEF DESCRIPTION OF THE DRAWINGS

These and other features and advantages of the present invention will be readily appreciated, as the same becomes better understood by reference to the following detailed description when considered in connection with the accompanying drawings wherein:

FIG. 1 is a cross-sectional view of an exemplary seal assembly constructed in accordance with one aspect of the present invention;

FIG. 4 is a front and enlarged view of a portion of a castellated feature of the first elastomeric member of the exemplary seal assembly of FIG. 1.

DESCRIPTION OF THE ENABLING EMBODIMENT

Figure 2:
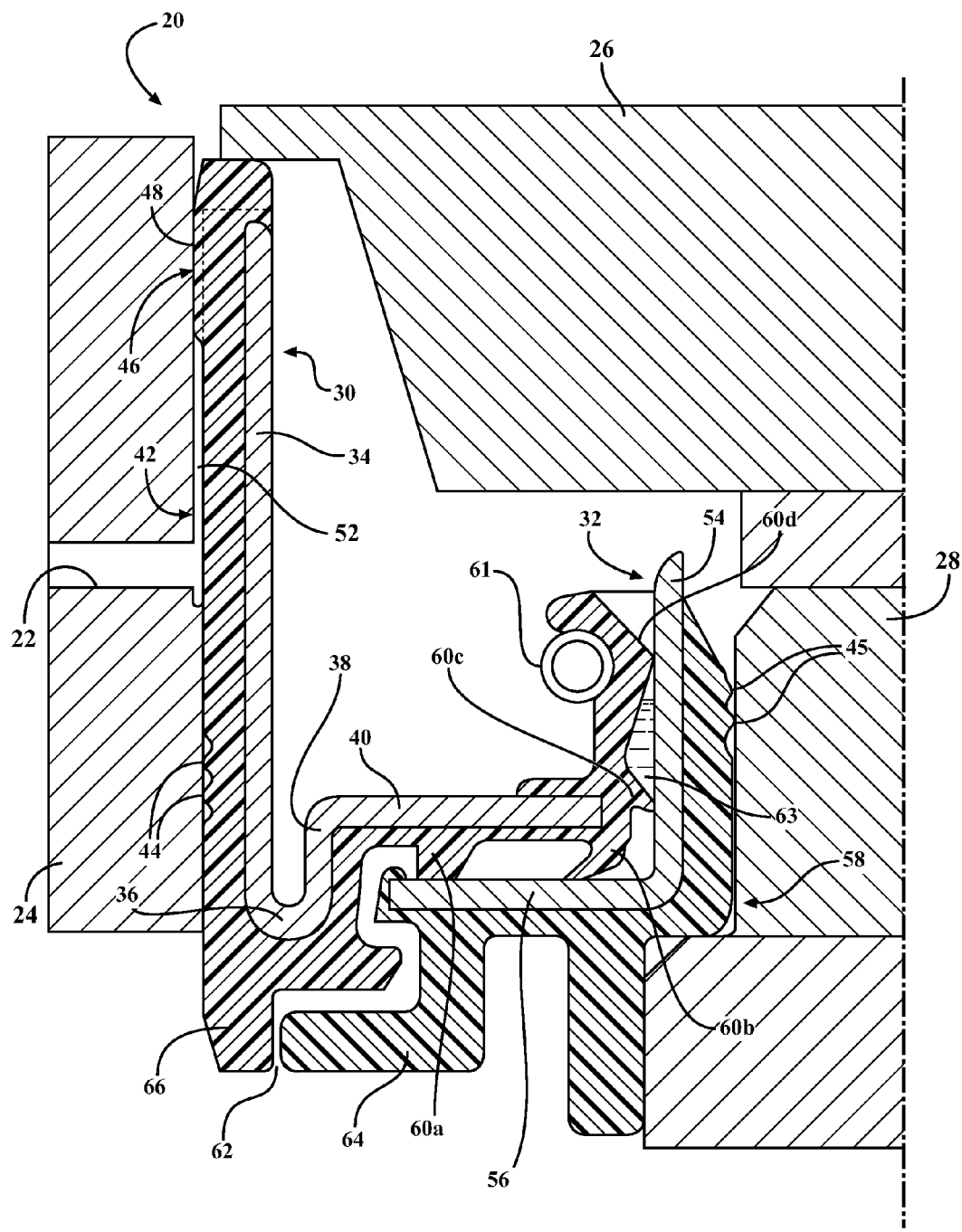
FIG. 2 is a fragmentary and cross-sectional view of the exemplary seal assembly of FIG. 1 installed in a front wheel assembly of a vehicle.
Figure 3:
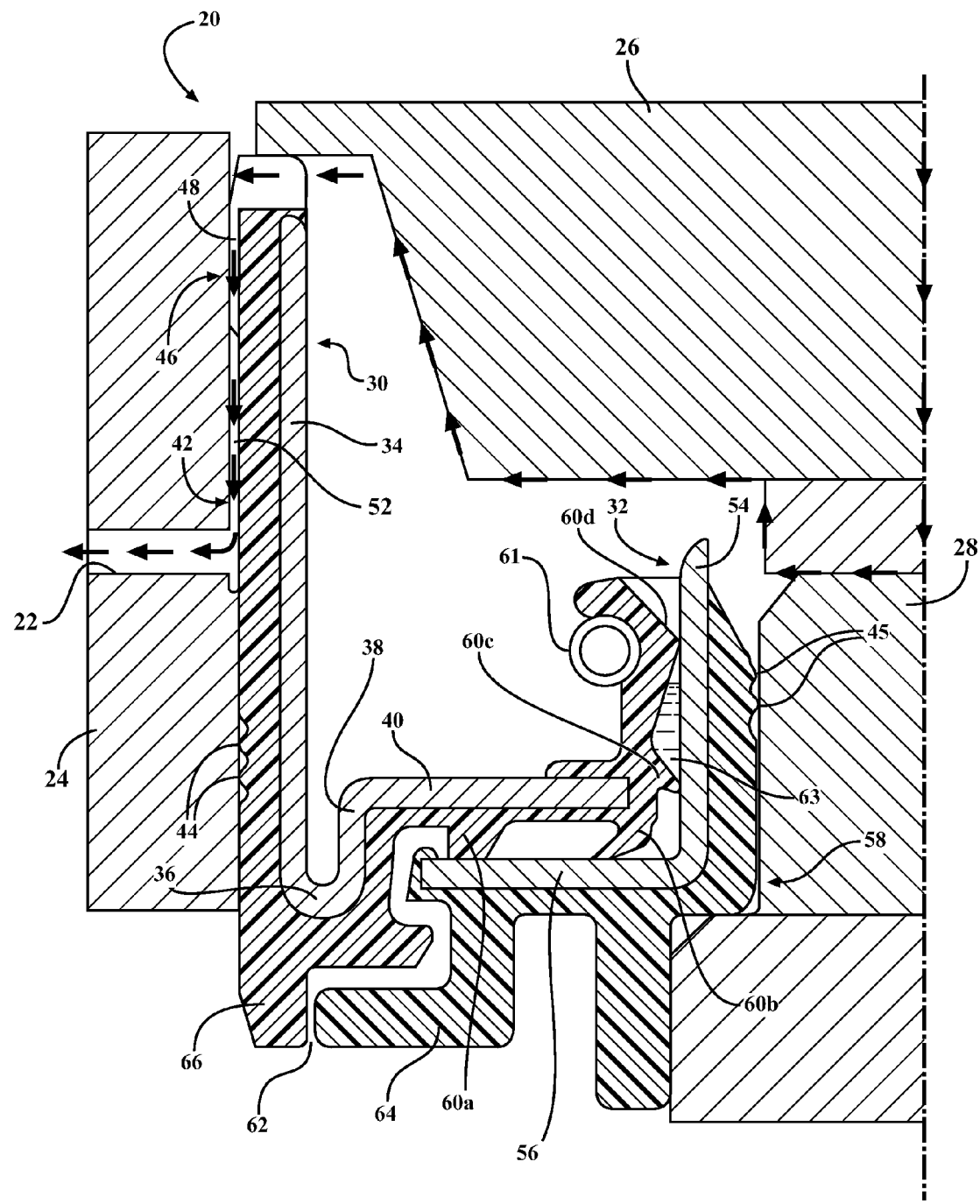
FIG. 3 is another fragmentary and cross-sectional view of the exemplary seal assembly of FIG. 1 installed in a front wheel assembly of a vehicle and taken from a different perspective from FIG. 2.

Referring to the Figures, wherein like numerals indicate corresponding parts throughout the several views, an exemplary seal assembly 20 constructed according to one aspect of the present invention is generally shown in FIG. 1 and generally indicated in FIGS. 2 and 3. The exemplary seal assembly 20 is configured for use in a front wheel assembly (shown in FIGS. 2 and 3) of a 4×4 (four-wheel drive) vehicle (such as a pick-up truck or a sport utility vehicle) with an Electronic-Shift-On-the-Fly (ESOF) system having a vacuum pump (not shown) which selectively activates to draw a vacuum through a vacuum port 22 in a steering knuckle 24 of each front wheel assembly. When the vacuum pump is activated, air is extracted from the locking hubs 26, thereby creating a pressure differential within the locking hubs 26 and causing the hubs 26 to engage with the axle shaft 28 or to disengage therefrom. The exemplary seal assembly 20 seals the steering knuckle 24 to an axle shaft 28 within each of the front wheel assemblies while still allowing air to pass from the associated hub 26 to the vacuum port 22 of the steering knuckle 24.

Referring to FIG. 1, the exemplary seal assembly 20 includes an outer case 30 which is configured to be received within the inner bore of a steering knuckle 24 and an inner case 32 which is configured to engage (directly or indirectly) around the outer surface of the axle shaft 28. As shown in FIG. 1, the exemplary outer case 30 is bent to include an outer rim 34 extending in an axial direction, an arc-shaped portion 36, an inner rim 38 and a first leg 40. The outer and inner rims 34, 38 are integrally connected with one another through the arc-shaped portion 36 such that the inner rim 38 is spaced radially inwardly of the outer rim 34. The first leg 40 of the exemplary seal assembly 20 extends radially inwardly from an end of the inner rim 38 opposite of the arc-shaped portion 36. The outer case 30 is preferably formed of steel and shaped through a deep drawing process. However, it should be appreciated that the outer case 30 could be shaped through any desirable process (such as roll forming, casting, machining, etc.) and could be of any suitable metal or non-metal (such as iron, aluminum, titanium, magnesium, composites, etc.). The exemplary seal assembly 20 also includes a first elastomeric member 42 which is in engagement with the outer case 30 and extends along the outer rim 34, of the arc-shaped portion 36 and the first leg 40. The first elastomeric member 42 is preferably attached to the outer case 30 through an overmolding process but could alternately be attached to the outer case 30 through any desirable process including, for example, through fasteners, adhesives, etc.

Referring now to FIG. 2, the vacuum port 22 of the steering knuckle 24 extends in a radial direction into the steering knuckle's 24 inner bore. When the exemplary seal assembly 20 is installed into the steering knuckle 24, the outer rim 34 of the outer case 30 and the portion of the first elastomeric member 42 which is attached to the outer rim 34 both extend axially on both sides of the vacuum port 22. In the exemplary embodiment, a portion of the first elastomeric member 42 extends circumferentially around the outer rim 34 of the outer case 30. As such, in the exemplary seal assembly 20, only the first elastomeric member 42 is in direct contact with the steering knuckle 24. This allows the exemplary seal assembly 20 to be installed into the steering knuckle 24 by an assembly worker or a mechanic by hand. This distinguishes the exemplary seal assembly 20 from many other known seal assemblies which have a metallic exterior surface, and thus, they must be urged into the steering knuckle 24 with a high force press. The first elastomeric material is preferably formed of a rubber material but could be formed of any other material capable of frictionally engaging the steering knuckle 24. On one axial side of the vacuum port 22, the first elastomeric member 42 additionally includes a plurality of locking ribs 44 which are axially spaced from one another to improve the frictional attachment of the seal assembly 20 to the steering knuckle 24.

On the axial side of the vacuum port 22 opposite of the locking ribs 44, the first elastomeric member 42 includes a castellated feature 46 including a plurality of radially outwardly extending projections 48 spaced from one another by a plurality of grooves 50, or channels. The first elastomeric portion is generally flat between the locking ribs 44 and the castellated feature 46, and thus, a cavity 52 exists between the steering knuckle 24 and the first elastomeric member 42 when the sealing assembly 20 is installed in the steering knuckle 24. The cavity 52 extends circumferentially around the first elastomeric member 42 and is in fluid communication with the vacuum port 22 of the steering knuckle 24. Preferably, the inner bore of the steering knuckle 24 is also expanded in this region to further increase the size of the cavity 52. The portion of the first elastomeric member 42 between the locking ribs 44 and the castellated feature 46 could be recessed to further increase the size of the cavity 52.

Referring now to FIG. 3, which is a cross-sectional view taken through one of the grooves 50 of the castellated feature 46, each groove 50 is generally L-shaped with an axial component and a radial component. An air path (shown as a plurality of arrows) extends from the hub 26; between the hub 26 and the seal assembly 20; through both the radial and axial components of the grooves 50 of the castellated feature 46; through the cavity 52; and to the vacuum port 22 of the steering knuckle 24. In operation, air is extracted from the hub 26 through this air path to selectively engage and disengage the locking hubs 26 to and from the vehicle's drivetrain. Since the cavity 52 extends circumferentially around the first elastomeric member 42, the air path exists regardless of the orientation of the seal assembly 20 relative to the steering knuckle 24. Thus, an assembly worker or a mechanic may insert the seal assembly 20 in any desirable orientation. This may decrease the time required to assemble the wheel assembly and also reduce the number of defective wheel assemblies. Additionally, if the seal assembly 20 reorients within the steering knuckle 24 during operation of the vehicle, it will not interfere with the performance of the vehicle's ESOF system.

Referring back to FIG. 2, in the areas of the radially outwardly extending projections 48, the castellated feature 46 is in frictional contact with the steering knuckle 24 to improve the attachment between these two components. Another view of the castellated feature 46 is shown in FIG. 4, which is a front, enlarged view of a portion of the castellated feature 46. The exemplary castellated feature 46 includes approximately four projections 48 which are generally uniformly sized and generally uniformly spaced from one another by four grooves 50. However, it should be appreciated that the castellated feature 46 could include any desirable number of projections 48, and the projections could have varying sizes and/or could be spaced from one another by varying distances.

Referring back to FIG. 1, the inner case 32 is bent into an L-shape as viewed in cross-section with an axial portion 54 extending in an axial direction and a second leg 56 extending radially outwardly from the axial portion 54. Similar to the outer case 30, the inner case 32 is preferably shaped through a deep drawing process and is formed of metal. However, it should be appreciated that the inner case 32 could be shaped through any desirable process and could be formed of any suitable metal or non-metal.

A second elastomeric member 58 is attached to and extends through the L-shape on one side of the inner case 32. In the exemplary embodiment, a portion of the second elastomeric member 58 is disposed radially inwardly of the axial portion 54 of the inner case 32. As such, when the exemplary seal assembly 20 is installed into the wheel assembly of the vehicle, only the second elastomeric member 58—not the inner case 32—is in engagement with the axle shaft 28. Thus, the exemplary seal assembly 20 can be installed onto the axle shaft 28 by an assembly worker or a mechanic by hand. This distinguishes the exemplary seal assembly 20 from other known seal assemblies which must be urged onto the axle shaft with a high-force press. Like the first elastomeric member 42, the second elastomeric member 58 is also preferably formed of a rubber material but could alternately be formed of any other material capable of frictionally engaging the axle shaft 28. In the exemplary embodiment, the axial portion 54 of the second elastomeric member 58 includes a plurality of locking ribs 45 spaced axially from one another to improve the attachment between the exemplary seal assembly 20 and the axle shaft 28.

Referring once again to FIG. 1, the first elastomeric member 42 includes a plurality of sealing lips 60a,b extending in an axial direction to engage and seal against the second leg 56 of the inner case 32 and a plurality of sealing lips 60c,d extending in a radially outwardly direction to seal against the axial portion 54 of the inner case 32. The exemplary seal assembly 20 additionally includes a garter spring 61 extending circumferentially around a portion of the first elastomeric member 42 for biasing at least one of the sealing lips 60d against the inner case 32 to improve the seal therebetween. A grease or some other type of lubricant is typically disposed on the side of the seal assembly 20 with the hub 26. Additionally, a grease pack 63 is disposed between two of the radially extending sealing lips 60c,d to reduce friction between those sealing lips 60c,d and the inner case 32 without compromising the seal established therebetween.

The first and second elastomeric members 42, 58 of the exemplary seal assembly 20 additionally combine to present a labyrinth 62 including a plurality of bends or curves, through which contaminants would have to navigate in order to cross the seal assembly 20. Specifically, the second elastomeric member 58 includes a generally L-shaped feature 64 extending axially away from the second leg 56 of the inner case 32 and radially outwardly, and the first elastomeric member 42 includes a protrusion 66 which projects to a free end adjacent the end of the L-shaped feature 64 of the second elastomeric feature. Together, the sealing lips 60 and the complicated labyrinth 62 sufficiently prevent contaminants from crossing the exemplary seal assembly 20.

In operation, when the axle shaft 28 and the inner case 32 rotate relative to the steering knuckle 24, the sealing lips 60 slide against the inner case 32 to prevent the grease from escaping through the seal assembly 20. The sealing lips 60 and the complicated labyrinth 62 formed by the first and second elastomeric members 42, 58 prevent water, dirt or other contaminants from leaking through the seal. Additionally, the castellated feature 46 of the first elastomeric member 42 and the cavity 52 formed adjacent thereto allow the vacuum port 22 of the steering knuckle 24 to extract air from the locking hub 26 to engage or disengage the locking hub 26 to or from the drivetrain of the vehicle. In contrast to other known seal assemblies, the exemplary seal assembly 20 accomplishes all of these objectives regardless its orientation relative to the steering knuckle 24.

Obviously, many modifications and variations of the present invention are possible in light of the above teachings and may be practiced otherwise than as specifically described while within the scope of the appended claims. In addition, the reference numerals in the claims are merely for convenience and are not to be read in any way as limiting.

What is claimed is:

1. A seal assembly for sealing a steering knuckle to an axle shaft and to a wheel hub of a vehicle, comprising:
    an inner case and an outer case disposed radially outwardly of said inner case;
    said outer case extending from a first end to a second end;
    a one piece elastomeric member secured with said outer case and including at least one lip in sliding contact with said inner case to establish a liquid-tight seal between said inner and outer cases when said inner case is rotated relative to said outer case;
    said elastomeric member having an outer surface which extends between opposite axial ends and is disposed on an outer radial side of said outer case;
    said outer surface of said elastomeric member including at least one locking feature for locking said seal assembly with one portion of the steering knuckle and including a generally flat portion and including a castellated feature that is disposed adjacent one of said axial ends on an opposite axial side of said generally flat portion from said locking feature;
    said castellated feature extending in an axial direction past one of said first and second ends of said outer case and in a radial direction past said generally flat portion; and
    said castellated feature including a plurality of generally L-shaped grooves with radially extending legs and axially extending legs, said L-shaped grooves being spaced circumferentially from one another, said radially extending legs extending in a radial direction past said one of said first and second ends of said outer case, and said axially extending legs extending axially to said generally flat portion of said elastomeric member.

2. The seal assembly as set forth in claim 1 wherein said elastomeric member secured with said outer case is a first elastomeric member.

3. The seal assembly as set forth in claim 2 wherein said first elastomeric member is in overmolded engagement with said outer case.

4. The seal assembly as set forth in claim 2 further including a second elastomeric member in engagement with said inner case.

5. The seal assembly as set forth in claim 4 wherein said second elastomeric member is in overmolded engagement with said inner case.

6. The seal assembly as set forth in claim 4 wherein said outer case includes an outer rim and wherein at least a portion of said first elastomeric member extends circumferentially around and said outer rim of said outer case for engaging an inner bore of the steering knuckle of the vehicle.

7. The seal assembly as set forth in claim 6 wherein said first elastomeric member includes a plurality of locking ribs.

8. The seal assembly as set forth in claim 6 wherein said inner case includes an axially extending portion and wherein at least a portion of said second elastomeric member extends along the inner circumference of said axially extending portion of said inner case for engaging the axle shaft of the vehicle.

9. The seal assembly as set forth in claim 8 wherein said second elastomeric member includes a plurality of locking ribs.

10. The seal assembly as set forth in claim 4 wherein said first elastomeric member includes at least one sealing lip extending radially to slidably abut said inner case.

11. The seal assembly as set forth in claim 10 further including a garter spring extending circumferentially around a portion of said first elastomeric member to bias said at least one sealing lip against said inner case.

12. The seal assembly as set forth in claim 4 wherein said outer case includes a first leg extending in a radially inward direction, wherein said inner case includes a second leg extending in a radially outward direction, and wherein said first and second legs are spaced axially from one another.

13. The seal assembly as set forth in claim 12 wherein at least one of said first and second elastomeric members includes at least one sealing lip extending axially between said first and second legs to restrict the passage of contaminants across said seal assembly.

14. The seal assembly as set forth in claim 13 wherein said first and second elastomeric members are shaped to present a labyrinth therebetween.

15. A front wheel assembly for a vehicle, comprising:
a steering knuckle having a vacuum port;
an axle shaft;
a pressure-activated locking hub for selectively engaging with and disengaging from said axle shaft; and
a seal assembly including;
an inner case and an outer case disposed radially outwardly of said inner case,
a one piece elastomeric member secured with said outer case and including at least one lip in sliding contact with said inner case to establish a liquid-tight seal between said inner and outer cases when said inner case is rotated,
said elastomeric member having an outer surface which extends between opposite axial ends and is disposed on an outer radial side of said outer case and is sealed directly against said steering knuckle and has a generally flat portion and a castellated feature,
said castellated feature being disposed adjacent one of said axial ends of said elastomeric member, and
wherein said castellated feature includes a plurality of projections that extend axially and radially and are spaced circumferentially from one another by L-shaped grooves with radially extending legs and axially extending legs to present an air path which extends from said pressure activated locking hub through said axially extending legs and said radially extending legs of said L-shaped grooves and into a gap between said outer surface of said elastomeric member and said steering knuckle and into said vacuum port of said steering knuckle.

* * * * *